3,313,747
POLYMERS PREPARED FROM ISO-
CYANATEOXAZOLIDINONES
Charles H. Schramm, Easton, Pa., assignor to J. T. Baker Chemical Company, Phillipsburg, N.J., a corporation of New Jersey
No Drawing. Filed Oct. 29, 1964, Ser. No. 407,530
8 Claims. (Cl. 260—2.5)

This invention relates to a novel class of isocyanate-oxazolidinone derivatives and to methods for their preparation. In a particular aspect this invention relates to polymerizable 2-oxazolidinone compounds having at least one isocyanate-containing substituent, polymerized derivatives of the 2-oxazolidinone compounds and to methods for their preparation.

It is an object of this invention to provide polymerizable, polymerized, and copolymerized isocyanateoxazolidinone and methods for their preparation.

It is another object of this invention to provide polymers uniquely adapted for many of the same applications as polyurethane resins. The polymers of the present invention range from elastic and fiber-forming thermoplastic resins to hard, tough thermoset products and can be used in applications which range from foams to cast elastomeric products.

Other objects and advantages of the present invention will become apparent to one skilled in the art from the accompanying description and disclosure.

In a preferred embodiment of this invention, a polyisocyanate is reacted with a diepoxide, wherein the reaction mixture contains a greater number of isocyanate groups as compared to epoxy groups, in the presence of an alcohol and a quaternary ammonium salt to produce a viscous polyisocyanate-2-oxazolidinone compound containing at least two 2-oxazolidinone groups and at least two isocyanate groups. This reaction product can be further reacted with isocyanate reactive compounds or catalysts to produce solid resinous products.

For the sake of convenience and clarity, some of the terms used herein are defined as follows:

(a) The term "polyisocyanate" refers to compounds containing two or more isocyanate (—NCO) groups;

(b) The term "epoxide" or "epoxy" refers to the oxirane group

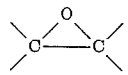

(c) The term "2-oxazolidinone" refers to the structure

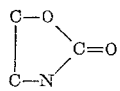

(d) The term "isocyanateoxazolidinone" or "isocyanate-substituted 2-oxazolidinone" refers to organic compounds containing one or more 2-oxazolidinone groups and one or more isocyanate groups.

The isocyanateoxazolidinone compounds of the present invention can be prepared by simply admixing the epoxy and isocyanate reactants in the presence of a catalyst mixture comprising an addition polymerization catalyst and an alcohol. The quantity of catalyst, i.e., the quaternary and alcohol cocatalysts, employed can vary over a wide range such as that of about 0.005% to about 15% by weight of the epoxy and isocyanate reactants and preferably from about 0.01% to about 10% by weight of the reactants. The reaction temperature can vary over a wide range such as that from about 20° C. to 150° C. and preferably the reaction mixture is heated above room temperature (i.e., above about 25° C.) to a temperature such as that of from above about 45° C. to about 95° C. The ratio of isocyanate reactant to epoxy reactant can vary over a broad range but designed to provide at least one unreacted isocyanate group in the isocyanateoxazolidinone compounds. Preferably, from about 1.5 to about 15 isocyanate groups are provided in the reaction mixture per epoxy group and particularly from about 2 to about 8 isocyanate groups per epoxy group.

The preferred catalyst for the reaction of isocyanates and epoxides to produce an isocyanateoxazolidinone are a mixture of a quaternary ammonium compound with a primary or secondary aliphatic alcohol, e.g., alkanol having from 1 to 6 carbon atoms. The rate of reaction increases with increasing concentrations of alcohol and quaternary. The active isocyanate content of the isocyanateoxazolidinone, however, decreases with increasing alcohol concentration. Preferably the catalyst mixture contains from about 1 to about 20 parts by weight of the aliphatic alcohol per part by weight of the quaternary and particularly from about 3 to about 9 parts by weight of the aliphatic alcohol per part by weight of the quaternary. Illustrative of the aliphatic alcohol component of the catalyst mixture, there can be mentioned various monohydroxy alcohols such as methanol, ethanol, n-propyl alcohol, normal butyl alcohol, n-hexyl alcohol, secondary butyl alcohol, amyl alcohol, isoamyl alcohol, isopropyl alcohol, and the like.

Illustrative of the quaternary cocatalyst, there can be mentioned those which have alkyl, cycloalkyl, or aralkyl substituents of from 1 to about 16 carbon atoms on the nitrogen, or the nitrogen can be part of a cycloaliphatic ring, e.g., piperidine. Illustrative of specific quaternary cocatalysts which can be employed, there can be mentioned tetraethylammonium bromide, tetramethylammonium bromide, benzyltriethylammonium bromide, tetrabutylammonium bromide, benzyltriethylammonium bromide, benzyltrimethylammonium bromide, and the corresponding chlorides, iodides and fluorides. The halide in the anionic portion of the quaternary can be chlorine, bromine, iodine or fluorine but preferably bromine. Preferred alkyl groups of the quaternary are lower alkyl groups, each having from 1 to about 6 carbon atoms. It has been found that the use of an insoluble quaternary such as tetraethylammonium chloride together with a primary or secondary aliphatic alcohol results in a very sluggish reaction.

Tertiary amines and other addition polymerization catalysts together with a primary or secondary aliphatic alcohol as mentioned hereinbefore can also catalyze the formation of the isocyanateoxazolidinone compounds. Generally, however, they have the disadvantage of causing further reactions of the isocyanate group and result in poor storage stability of the compounds. Illustrative of suitable tertiary amine cocatalyst, there can be mentioned triethylamine, triethylene diamine of N-methyl morpholine, and the like.

The isocyanateoxazolidinone compounds of the present invention are generally viscous liquids. However, hard solids can also be produced. The isocyanateoxazolidinone compounds of this invention are characterized by molecular weights which can vary over a wide range, and particularly from about 325 to 1,200; however, the molecular weights can range up to 5,000 or higher. The isocyanateoxazolidinones can be molded under heat and pressure or they can be further cured through the use of curing or polymerization agents, such as water, polyols, diamines, etc., commonly employed for polyurethanes. The cured polymeric compositions of the present invention are well suited for such applications as gears, bearings, bushings, solid tires, ball joint liners, heel lifts, insulating and cushioning foams, coatings, potting, and encapsulation.

Illustrative of the process for preparing isocyanateoxazolidinone compounds is the interaction of (1) toluene diisocyanate with butadiene diepoxide; and (2) (a) glycidyl methacrylate or (b) 1,2-epoxybutene-3 with toluene diisocyanate as illustrated below:

(1)

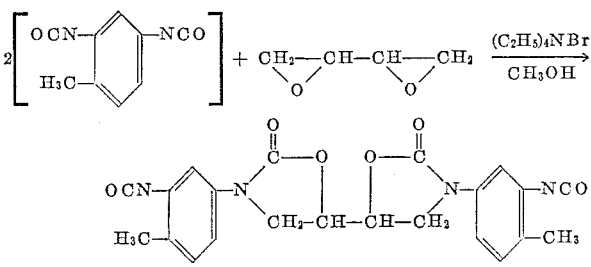

(2) (a)

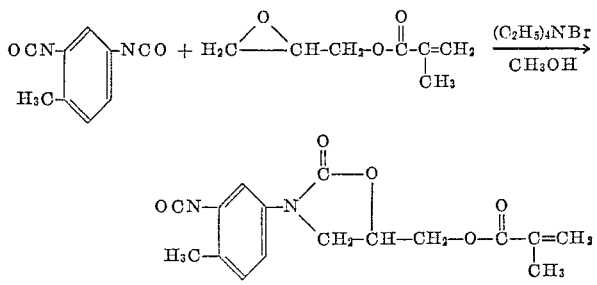

(2) (b)

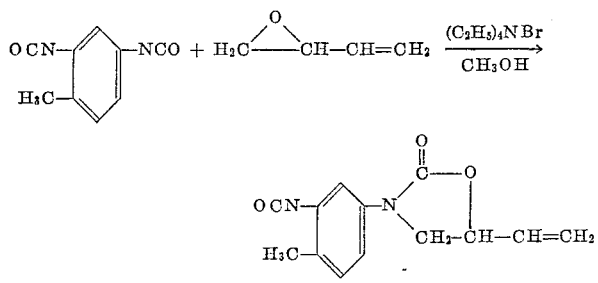

The reactions of (2) (a) and (b) above produce a unique type of compound which can be polymerized either through the isocyanate group or the vinyl group. Once the compound is polymerized (e.g., through the vinyl group), the remaining reactive site in the molecule (e.g., the isocyanate group) can serve as a cross-linking means to produce a more thermosetting resin.

As mentioned hereinbefore, the catalyst includes a quaternary and an alcohol. Although applicant does not wish to be bound by any theory for the reaction mechanism involved, it appears that the reaction proceeds according to the following brief outline:

(a) Formation of the urethane by reaction of alcohol with an isocyanate group as can be represented by the following generic equation.

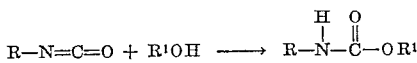

and (b) Reaction of the urethane with an oxirane group as can be represented by the following generic situation

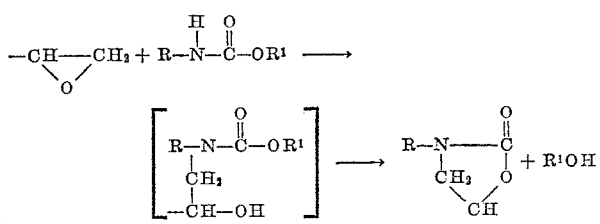

Isocyanateoxazolidinone compounds of this invention include those which correspond to the structure:

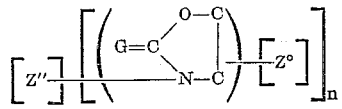

where Z'' is a polyvalent organic radical, Z° is a polyvalent organic radical which contains at least one isocyanate group, and $n$ is a whole number of from 2 to 10 and higher.

Among the preferred isocyanateoxazolidinone compounds are those which correspond to the structure:

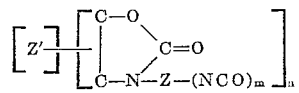

wherein Z is a polyvalent organic radical selected from aliphatic and aromatic structures such as alkylene, substituted alkylene, alkyleneoxy, alkenylene, substituted alkenylene, arylene, substituted arylene, and the like; Z' is a polyvalent organic radical selected from aliphatic and aromatic structures such as alkylene, substituted alkylene, alkyleneoxy, cycloalkylene, substituted cycloalkylene, arylene, substituted arylene, aryleneoxy, substituted aralkylene, and the like, and Z' can also be zero, i.e., Z' can be a covalent bond directly connecting an oxazolidinone group with an isocyanate group; G is sulfur or oxygen, $m$ is a whole number of from 1 to 5 and higher, and $n$ is a whole number such as that of from 1 to 10 and higher.

In the reaction of two moles of a diisocyanate such as toluene diisocyanate with one mole of a diepoxide, the reaction product contains an isocyanateoxazolidinone which can be represented by the formula $$OCN-R(A-R''-A-R)_n-NCO$$

wherein each of R represents the organic residue of a diisocyanate, R'' represents the organic residue of a diepoxide, and each A represents the 2-oxazolidinone group, i.e.,

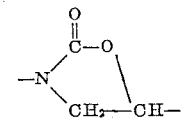

and $n$ is an integer representing the number of repeating units of the reaction product.

In addition to carbon, hydrogen, oxygen, sulfur, nitrogen, and halogen atoms, the compounds and resins of the present invention can contain silicon, titanium, phosphorus, and the like.

Polyisocyanate reactants suitable for use in the production of the isocyanateoxazolidinone compounds include isocyanate compounds and isocyanate containing prepolymers which are being developed for commercially important polyurethane chemistry.

Among the preferred polyisocyanate reactants are those corresponding to the formula $R(NCG)_x$ wherein G is oxygen or sulfur, $x$ is an integer of two or more, and R is the organic residue of a polyisocyanate such as alkylene, substituted alkylene, arylene or substituted arylene radical, a hydrocarbon or substituted hydrocarbon containing one or more aryl —NCG bonds and one or more alkyl —NCG bonds. R can also include radicals such as —RZR— where Z can be a divalent moiety such as —O—, —O—R—O—, —CO—, —CO₂—, —S—, —S—R—S—, —SO₂— and the like. Examples of such compounds include hexamethylene diisocyanate, xylene diisocyanate, 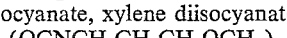
1-methyl-2,4-diisocyanatocyclohexane, phenylene diisocyanates, tolylene diisocyanates, chlorophenylene diisocyanates, polyhalophenylene diisocyanates, diphenylmethane-4,4'-diisocyanate, naphthalene-1,5-diisocyanate, triphenylmethane-4,4',4''-triisocyanate, xylene-α,α'-diisothiocyanate, isopropylbenzene-α,4-diisocyanate, and the like.

Further included among the polyisocyanate reactants are dimers and trimers of isocyanates and diisocyanates and polymeric diisocyanates of the general formula $(RNCG)_x$ and $[R(NCG)_x]_y$ in which $x$ and $y$ are two or more, as well as compounds of the general formula $M(NCG)_x$ in which $x$ is two or more and M is a monofunctional or polyfunctional atom or group. Examples of this type include ethylphosphonic diisocyanate, $$C_2H_5P(O)(NCO)_2$$

phenylphosphonic diisocyanate, $C_6H_5P(NCO)_2$; compounds containing a $\equiv$Si—NCG group, isocyanates derived from sulfonamides, $R(SO_2NCO)_x$; and the like.

A particularly useful mixture of polyisocyanates are the products obtainable by phosgenation of the reaction products of aniline and formaldehyde as expressed by the following general formula:

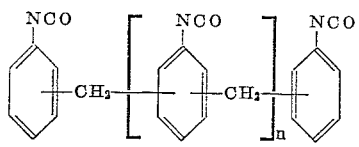

wherein $n$ equals 0 to 10.

Epoxide reactants suitable for use in the preparation of the isocyanateoxazolidinone compounds of this invention are essentially unlimited, and the particular epoxide selected will depend on cost, availability, reactivity, the properties of the product sought to be produced, and other practical considerations. The epoxides can be those containing aromatic, aliphatic, or cycloaliphatic groups together with the epoxy group. Useful polyepoxides include glycidyl ethers derived from epichlorohydrin adducts of polyols and polyhydric phenols. Other polyepoxides include:

3-methyl-1,5-pentanediol-bis(3,4-epoxycyclohexanecarboxylate),
1,5-pentanediol bis(3,4-epoxycyclohexanecarboxylate),
2-methoxymethyl-2,4-dimethyl-1,5-pentanediol bis(3,4-epoxycyclohexanecarboxylate),
ethylene glycol bis(3,4-epoxycyclohexanecarboxylate),
2,2-diethyl-1,3-propanediol bis(3,4-epoxycyclohexanecarboxylate),
1,6-hexanediol bis(3,4-epoxycyclohexanecarboxylate),
2-butene-1,4-diol bis(3,4-epoxy-6-methylcyclohexanecarboxylate),
1,1,1-trimethylolpropane tris(3,4-epoxycyclohexanecarboxylate),
1,2,3-propanetriol tris(3,4-epoxycyclohexanecarboxylate);

oxyalkylene glycol epoxycyclohexane carboxylates exemplified by compounds which include dipropylene glycol bis(2-ethylhexyl-4,5-epoxycyclohexane-1,2-dicarboxylate),
diethylene glycol bis(3,4-epoxy-6-methylcyclohexanecarboxylate),
triethylene glycol bis(3,4-epoxycyclohexanecarboxylate);

epoxycyclohexylakyl epoxycyclohexanecarboxylates exemplified by compound which include 3,4-epoxycyclohexylmethyl 3,4-epoxycyclohexanecarboxylate,
3,4-epoxy-1-methylcyclohexylmethyl 3,4-epoxy-1-methylcyclohexanecarboxylate,
3,4-epoxy-2-methylcyclohexylmethyl 3,4-epoxy-2-methylcyclohexanecarboxylate,
(1-chloro-3,4-epoxycyclohexan-1-yl)methyl 1-chloro-3,4-epoxycyclohexanecarboxylate,
(1-bromo-3,4-epoxycyclohexanol-yl)methyl 1-bromo-3,4-epoxycyclohexanecarboxylate,
(1-chloro-2-methyl-4,5-epoxycyclohexan-1-yl)methyl 1-chloro-2-methyl-4,5-epoxycyclohexanecarboxylate;

epoxycyclohexylakyl dicarboxylate exemplied by compounds which include bis(3,4-epoxycyclohexylmethyl) pimelate,
bis(3,4-epoxy-6-methylcyclohexylmethyl) maleate,
bis(3,4-epoxy-6-methylcyclohexylmethyl) succinate,
bis(3,4-epoxycyclohexylmethyl) oxalate,
bis(3,4-epoxy-6-methylcyclohexylmethyl) sebacate,
bis(3,4-epoxy-6-methylcyclohexylmethyl) adipate;

epoxycyclohexylalkyl phenylenedicarboxylates exemplified by compounds which include bis(3,4-epoxycyclohexylmethyl) terephthalate,
bis(3,4-epoxy-6-methylcyclohexylmethyl) terephthalate;

epoxycyclohexylalkyl oxyalkylene glycol ethers exemplified by compounds which include bis(3,4-epoxy-6-methylcyclohexylmethyl) diethylene glycol ether; sulfonyldialkanol bis(epoxycyclohexanecarboxylates) exemplified by compounds which include 2,2′-sulfonyldiethanol bis-(3,4-epoxycyclohexanecarboxylate); epoxycyclohexane-1,2-dicarboximides exemplified by compounds which include N,N′-ethylene bis(4,5-epoxycyclohexane-1,2-dicarboximide); epicyclohexylalkyl carbamates exemplified by compounds which include di(3,4-epoxycyclohexylmethyl) 1,3-tolylenedicarbamate; epoxycyclohexylalkyl acetals exemplified by compounds which include bis(3,4-epoxy-6-methylcyclohexylmethyl) 3,4-epoxy-6-methylcyclohexanecarboxaldehyde acetal; and epoxycyclohexyl-substituted spirobi-(metadioxane) derivatives exemplified by compounds which include 3,9-bis(3,4-epoxycyclohexyl)spirobi-(metadioxane). Other poly-(epoxy) compounds can be employed such as 3,4-epoxy-6-methylcyclohexylmethyl 9,10-epoxystearate, 1,2-bis(2,3-epoxy-2-methylpropoxy)-ethane, the diglycidyl ether of 2,2-(p-hydroxyphenyl)propane, butadiene dioxide dicyclopentadiene dioxide, pentaerythritol tetrakis(3,4-epoxycyclohexanecarboxylate), vinylcyclohexene dioxide, divinylbenzene dioxide, and the like.

Polymerizable isocyanateoxazolidinone compositions can comprise mixtures of the isocyanateoxazolidinone compounds described hereinabove and a catalytic quantity of an active polymerization or curing agent. The quantity of polymerization or curing agent can vary over a wide range such as that of from about less than 0.005 to over 15 weight percent based on the total weight of the polymerizable material in the composition, with between about 0.01 and 10 weight percent being preferred.

Water may be employed as at least a portion of the curing agent, as is conventional in the polyurethane art, when foamed products are desired. Water may be used along with amines and other curing agents and/or with other foaming agents such as low boiling liquids (trichloromonofluoromethane) or blowing agents. Curing by means of water, in the presence of a suitable catalyst such as tertiary amine, results in a polymeric product containing a multiplicity of urea and oxazolidinone groups. Aromatic amines are preferred as curing or polymerization agents since they yield maximum hardness, chemical resistance, toughness and load bearing capacity. Polyols, in the presence of suitable catalysts such as stannous octoate or tertiary amines, may be used as inexpensive curing agents but with the sacrifice of certain properties such as chemical resistance and hydrolytic stability. This is due to the introduction of urethane groups into the polymer by reaction of the isocyanate groups with the hydroxyl groups of the polyol.

The polymerizable compositions comprising an isocyanateoxazolidione compound and a polymerization or curing agent can be prepared by the simple expediency of mixing together the composition components at room temperature. The polymerizable compositions can be prepared at the time that they are to be utilized or they can be prepared and stored for future application. The incorporation of the catalyst into the polymerizable compositions can be facilitated if desired, by preparing a catalyst solution with a suitable solvent such as xylene, ethyl acetate, heptane, dioxane, ethyl ether, and the like. The curing, i.e., polymerization, occurs readily with or without a solvent at a temperature in the range between about 10° C. and 200° C. Preferably the curing or polymerization is conducted by heating the reaction mixture at a temperature above 25° C. and particularly above about 45° C. The polymerization time can vary over a wide range from several minutes to several days depending on such factors as the nature of the isocyanateoxazolidinone, the quantity and reactivity of the catalyst, the absence or presence of a solvent, and the like.

Illustrative of polymerized and polymerizable isocyanateoxazolidinone compositions containing a polymerization or curing agent, the following can be mentioned:

(1) Polymerizable and polymerized compositions can be prepared from admixtures which comprise (a) isocyanateoxazolidinone and (b) a polyfunctional amine, i.e., an amine having at least two active amino hydrogen atoms which can be on the same nitrogen atom or different nitrogen atoms, preferably in an amount sufficient to provide between about 0.2 to 4.0 amino hydrogen atoms per isocyanate group of said isocyanateoxazolidinone and preferably between about 0.5 and 2.0 amino hydrogen atoms per isocyanate group. Suitable polyfunctional amines include monoamines, diamines, triamines, and higher polyamines such as 2-ethylhexylamine, aniline, phenethylamine, cyclohexylamine, 2-aminophenol, 1,3-diamino - 2 - propanol, ethylenediamine, butylenediamine, xylylenediamine, hexamethylenediamine, dihexylenetriamine, diethylenetriamine, triethylenetetraamine, dipropylenetriamine, m-phenylenediamine, p-phenylenediamine, quanidine, p,p'-sulfonyldiamine, p,p'-methylenedianiline, 4,4'-methylenedianiline, and the like.

(2) Polymerizable and polymerized compositions can be prepared from admixtures which comprise (a) an isocyanateoxazolidinone and (b) a polycarboxylic acid. Illustrative polycarboxylic acids which can be employed include aliphatic, aromatic, and cycloaliphatic polycarboxylic acids such as oxalic acid, malonic acid, glutaric acid, maleic acid, suberic acid, citraconic acid, 1,2-cyclohexanedicarboxylic acid, phthalic acid, 1,8-naphthalenedicarboxylic acid, 3-carboxycinnamic acid, 1,2,4-butanetricarboxylic acid, 1,2,4-hexanetricarboxylic acid, 1,2,4-benzenetricarboxylic acid, and the like; polycarboxy polyesters, i.e., polyesters containing more than one carboxy group per molecule, such as polycarboxylic acids of the type exemplified above.

(3) Polymerizable and polymerized compositions can be prepared from admixtures comprising (a) an isocyanateoxazolidinone and (b) a polyol, i.e., an organic compound having at least two hydroxyl groups which are alcoholic hydroxyl groups, phenolic hydroxyl groups, or both alcoholic and phenolic hydroxyl groups, e.g., aliphatic and cycloaliphatic polyalcohols and polyhydric phenols. The polyol is employed in an amount which provides between about 0.2 and 4.0 hydroxyl equivalents per isocyanate equivalent of said isocyanateoxazolidinone. These compositions can be further modified by incorporating therein a polycarboxylic acid compound such as those illustrated in Section (2) above. Typical polyols which can be employed include ethylene glycol, diethylene glycol, glycerol, polypropylene glycols, butanediol, triethanolamine, pentaerythritol, trimethylolethane bis(4-hydroxyphenyl) methane, inositol, sorbitol, trimethylolphenol, resorcinol, pyrogallol, hydroquinone, 1,8-naphthalenediol, 2,4,6 - trimethylolphenol allyl ether, cyclohexanediol, and the like.

(4) Polymerizable and polymerized compositions can be prepared from admixtures which comprise (a) an isocyanateoxazolidinone and (b) a polycarboxylic acid such as those illustrated in Section (2) above in an amount sufficient to provide between 0.3 and 3.0 carboxyl equivalents per isocyanate equivalent of said isocyanateoxazolidinone. A polyol of the type exemplified in Section (3) above can be employed to further modify the compositions. In these admixtures the polycarboxylic acid is a major component as compared with the polyol modifier.

(5) Polymerizable and polymerized compositions can be prepared from admixtures comprising (a) an isocyanateoxazolidinone and (b) any one of the following classes of compounds, namely, polythiols such as the sulfur analogs of the polyols listed in Section (3) above, phenol-aldehyde condensates, urea-aldehyde condensates, melamine-aldehyde condensates, polyamines, polyamides, polycarboxylic acid halides, and the like.

The following examples will serve to illustrate specific embodiments of the present invention.

*Example I*

Sixty grams of 2,4-tolylene diisocyanate (0.34 mole) was mixed with 230 grams (0.1 mole) of the diglycidyl ether derived from 1 mole of Pluracol–2000 (a polypropylene glycol having an average molecular weight of about 2000) and 4 moles of epichlorohydrin. One gram of a 20% solution by weight of tetraethylammonium bromide in methanol was added and the mixture was heated to 80° C. with stirring. An exothermic reaction took place and cooling was necessary to maintain the temperature at 80–81° C. for 15 minutes. The product was a milky-colored syrup having a viscosity of greater than 200,000 cp. (25° C.) and contained 1.1% oxazolidone nitrogen and 5.2% isocyanate.

*Example II*

Sixty-two grams (0.05 mole) of a polyglycidyl ether derived from the reaction of 1 mole of a triol of molecular weight 450 (derived from trimethylol propane and propylene oxide) condensed with 10 moles of epichlorohydrin was mixed with 44 grams (0.25 mole) of 2,4-tolylene diisocyanate and 0.5 gram of a 20% solution of tetraethylammonium bromide in methanol and heated to 50° C. The exothermic reaction which took place caused the temperature to rise to 75° C. The temperature was maintained at 75° C. for ½ hour and the product was cooled to room temperature. The product was a clear yellow syrup having a viscosity of greater than 200,000 cp. (25° C.).

*Example III*

Five grams of 4,4-methylene-bis-2-chloroaniline were melted and thoroughly mixed with 10 grams of the product of Example I. The mixture was poured into a ½" x ½" x 5" mold and cured at 90–95° C. for two hours to give a flexible polymer.

*Example IV*

Isocyanateoxazolidinones can be prepared by simply substituting in the procedure of Example I any of the following epoxides for the diglycidyl ether of polypropylene glycol in a quantity sufficient to provide an equivalent number of epoxy groups: the diglycidyl ether of 2,2-(p-droxyphenyl)propane; butadiene dioxide; and 3-methyl 1,5 - pentanediol - bis(3,4 - epoxycyclohexanecarboxylate); also isocyanateoxazolidinones can be prepared by simply substituting in the procedure of Example I any of the following polyisocyanates for the 2,4-toluene diisocyanate in a quantity sufficient to provide an equivalent number of isocyanate groups: diphenylmethane-4',4-diisocyanate; naphthalene-1,5-diisocyanate; and the like.

*Example V*

Following the procedure of Example III, the thermoset polymer can be prepared by simply substituting triethanolamine for the MOCA of Example III.

*Example VI*

Two hundred and thirty grams (0.1 mole) of diglycidyl ether derived from the reaction of Pluracol-200 (1 mole) and epichlorohydrin (4 moles) were mixed with 60 grams (0.34 mole) of 2,4-toluene diisocyanate. One gram of a 20% by weight solution of tetramethylammonium chloride in methanol was added and the mixture was slowly heated to 130° C. and held at this temperature for one hour; the reaction mixture was then cooled to room temperature. The isocyanateoxazolidinone compound was a mobile, milky syrup having a Brookfield viscosity of 2,800 cp. (25° C.).

*Example VII*

Diglycidyl ether, 215 grams (0.05 mole) derived from the reaction of 1 mole of polypropylene glycol having an average molecular weight of 400 with 4 moles of epichlorohydrin, was mixed with 30 grams (0.17 mole) of toluene diisocyanate (2,4 isomer). Five grams of a 20% by weight solution of tetraethylammonium bromide in methanol were added and the mixture was slowly heated to 100° C. and held at that temperature for 15 minutes, after which time it was permitted to cool. The isocyanateoxazolidinone product was a clear yellow syrup having a Brookfield viscosity of 5,680 cp. (25° C.).

*Example VIII*

Following the procedure of Example VII, isocyanateoxazolidinones can be prepared by simply substituting an equal quantity of ethanol, isopropanol or secondary butanol for the methanol of that example. Also, by following the procedure of Example VII, isocyanateoxazolidinones can be prepared by simply substituting an equal quantity of tetra(n butyl)ammonium iodide or triethylamine for the tetraethylammonium bromide of that example.

*Example IX*

One gram of glycerol is mixed with 10 grams of the product of Example II. The mixture is poured into a mold and heated at about 90° C. for 3 hours to give a solid polymer.

*Example X*

Two milliliters of water (0.111 mole) and 1 milliliter of diethylcyclohexylamine are added to 50 grams of the product of Example I. The mixture is stirred thoroughly with a mechanical stirrer or paddle for about 20 to 30 seconds and quickly poured into a mold. After a few minutes standing at room temperature, the mixture is foamed to a solid plastic.

What is claimed is:

1. A process for preparing a polymerizable composition having substituted oxazolidinone groups which comprises reacting a mixture of a polyepoxide with an organic polyisocyanate wherein the ratio of isocyanate groups to epoxy groups of said mixture is from about 1.5 to about 15 isocyanate groups per epoxy group, in the presence of a quaternary ammonium halide and an alcohol selected from the group consisting of a primary monohydroxy alkanol having from 1 to 6 carbon atoms and a secondary monohydroxy alkanol having from 1 to 6 carbon atoms, the quantity of said alkanol being from about 1 to about 20 parts, by weight, per part of said quaternary.

2. A process for preparing a polymerized product which comprises heating an isocyanate reactive compound selected from the group consisting of an amine having at least two reactive amino hydrogen atoms, a polycarboxylic acid and a polyol having at least two hydroxyl groups, with a liquid polymerizable composition having the formula

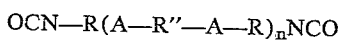

wherein each R represents the organic residue of a diisocyanate after removal of the NCO groups, R" represents the organic residue of a diepoxide after removal of the oxirane groups, each A represents the group

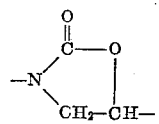

and $n$ is a positive integer representing units of the (A—R"—A—R) group.

3. A polymerized composition prepared by mixing: (a) an isocyanate reactive compound selected from the group consisting of an amine having at least two reactive amino hydrogen atoms, a polycarboxylic acid, and an organic polyol having at least two hydroxy groups; with (b) a liquid polymerizable composition having the formula

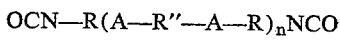

wherein each R represents the organic residue of a diisocyanate after removal of the NCO groups, R" represents the organic residue of a diepoxide after removal of the oxirane groups, each A represents the group

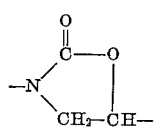

and $n$ is a positive integer representing units of the (A—R"—A—R) group.

4. A polymerized composition of claim 3 wherein the reactive compound is an amine having at least two reactive amino hydrogen atoms.

5. A process for preparing a polymerizable composition having substituted oxazolidinone groups and isocyanate groups which comprises reacting an organic diisocyanate with a diepoxide in a ratio of about two moles of the diisocyanate per mole of the diepoxide in the presence of a catalytically effective quantity of a mixture of a quaternary ammonium bromide and methanol, the quantity of methanol being from about 3 to 9 parts, by weight, per part of the quaternary ammonium bromide.

6. A process for preparing a foamed polymer which comprises mixing: (a) water; with (b) a liquid polymerizable composition of a 2-oxazolidinone having at least two substituted 2-oxazolidinone groups and at least two isocyanate groups having the formula

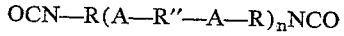

wherein each R represents the organic residue of a diisocyanate after removal of the NCO groups, R" represents the organic residue of a diepoxide after removal of the oxirane groups, each A represents the group

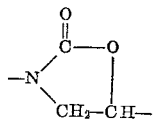

and $n$ is a positive integer representing units of the (A—R"—A—R) group.

7. A foamed polymer prepared by the process of claim 6.

8. A polymeric composition obtained by mixing an isocyanate reactive compound selected from the group consisting of an amine having at least two reactive amino hydrogen atoms, a polycarboxylic acid, and a polyol having at least two hydroxyl groups, with a viscous, polymerizable composition of a 2-oxazolidinone having at least two substituted 2-oxazolidinone groups and at least two isocyanate groups, said 2-oxazolidinone having the formula

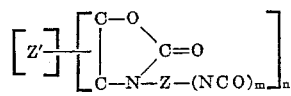

wherein each of Z and Z' is a polyvalent organic radical selected from the group consisting of an aliphatic and an aromatic radical; $m$ is an integer from 1 to 5 and $n$ is an integer from 1 to 10.

References Cited by the Examiner
UNITED STATES PATENTS
3,020,262   2/1962   Speranza _____ 260—47

DONALD E. CZAJA, *Primary Examiner.*
LEON J. BERCOVITZ, *Assistant Examiner.*

UNITED STATES PATENT OFFICE
CERTIFICATE OF CORRECTION

Patent No. 3,313,747                                April 11, 1967

Charles H. Schramm

It is hereby certified that error appears in the above numbered patent requiring correction and that the said Letters Patent should read as corrected below.

Column 1, line 19, after "zolidinone" insert -- composition --; column 3, line 65, for "situation" read -- equation --; lines 70 to 75, the formula should appear as shown below instead of as in the patent:

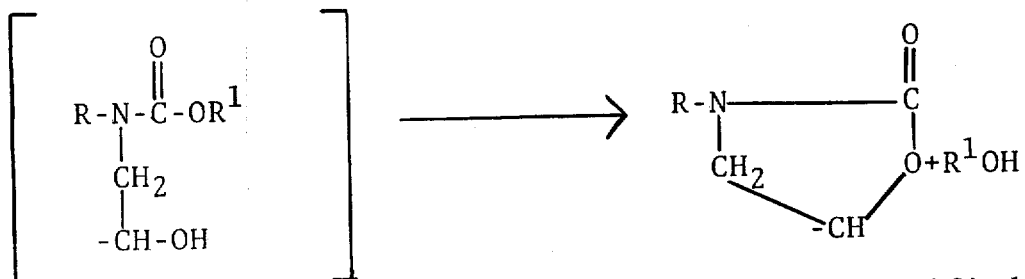

column 6, line 1, for "exemplied" read -- exemplified --; line 2 for "epicyclohexylalkyl" read -- epoxycyclohexylalkyl --; line 34, for "2,2-(p-hydroxyphenyl)" read -- 2,2-(p-hydroxylphenyl) --; line 68, for "anateoxazolidione" read -- anateoxazolidinone --; column 8, line 58, for "droxyphenyl)" read -- hydroxyphenyl) --; line 74, for "Pluracol-200" read -- PLURACOL-2000 --; column 9, line 13, for "400" read -- 4000 --.

Signed and sealed this 14th day of November 1967.

(SEAL)
Attest:

EDWARD M. FLETCHER, JR.                      EDWARD J. BRENNER
Attesting Officer                             Commissioner of Patents